US011442971B1

(12) United States Patent
Kiencke et al.

(10) Patent No.: US 11,442,971 B1
(45) Date of Patent: Sep. 13, 2022

(54) SELECTIVE DATABASE RE-INDEXING

(71) Applicant: Adobe Inc., San Jose, CA (US)

(72) Inventors: Thomas Kiencke, Bad Oldesloe (DE); Arne Frederik Franken, Hamburg (DE)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/331,246

(22) Filed: May 26, 2021

(51) Int. Cl.
*G06F 16/31* (2019.01)
*G06F 9/54* (2006.01)
*G06F 16/383* (2019.01)

(52) U.S. Cl.
CPC ............ *G06F 16/328* (2019.01); *G06F 9/546* (2013.01); *G06F 16/383* (2019.01)

(58) Field of Classification Search
CPC ...... G06F 16/93; G06F 16/951; G06F 16/219; G06F 16/9535
See application file for complete search history.

(56) References Cited

U.S. PATENT DOCUMENTS

2006/0106792 A1* 5/2006 Patterson ............ G06F 16/9535
2016/0253397 A1* 9/2016 Frye ........................ G06F 16/27
707/624

* cited by examiner

*Primary Examiner* — Baoquoc N To
(74) *Attorney, Agent, or Firm* — Finch & Maloney PLLC

(57) ABSTRACT

Techniques are provided for selective re-indexing of a database. A pre-defined set of document properties are associated with one or more documents stored in a primary database. A schema defines which of the document properties are stored in a search database. When a search query is executed against a search database, a document satisfying the search query is returned from the search database along with the corresponding schema version number. If the schema version number associated with the document stored in the storage database is different from a target version number stored in a schema version lookup table, the data in the search database is presumed to be stale and a re-indexing of the search database is requested to bring the database current.

20 Claims, 6 Drawing Sheets

SELECTIVE DATABASE RE-INDEXING

FIELD OF THE DISCLOSURE

This disclosure relates generally to the field of database management systems, and more particularly, to techniques for selectively re-indexing databases.

BACKGROUND

A primary database is a data structure that can be used to store data. A potential problem with the primary database is that it may not be optimized to execute search queries on arbitrarily selected properties of the data. Such queries can place a processing burden on the primary database. Therefore, to reduce this burden, a separate search database, or more broadly, a search engine, can be used to facilitate access to the data in the primary database. Each time the data in the primary database changes, an indexing service copies the data, including a set of document properties, pre-defined in a schema, into the search database, which keeps the search database synchronized with the primary database. However, there are several situations where the indexing of the search database may fail or otherwise be incomplete. For example, the indexing may fail if there is a bug in the indexing service or an outage of the indexing service or any associated system. Furthermore, if a new document property is introduced into the set of document properties defined in the schema, but is not yet available for all existing records, then the document in the search database must be re-indexed to include the new property (e.g., the new document property is transferred from the primary database to the search database on a per-document basis to facilitate searching on the property). If the document properties in the search database become out-of-sync with the document properties in the primary database(s), then at least some of the data in the search database may be stale or otherwise incomplete (for example, the search database may not include all of the document properties). The process of proactively synchronizing the document properties in the search database with the document properties in the primary database, also referred to as re-indexing, can be very expensive because potentially all of the data in the primary database (even if it is not stale) must be re-indexed in the search database, which for large databases can consume days, weeks, or months of processing time. Therefore, there remain non-trivial problems associated with re-indexing.

SUMMARY

Techniques are provided herein for selectively re-indexing a database or other type of data store, transferring the data to a search engine or search database. A schema defines a set of searchable properties that are associated with a document or a class of documents. The document properties, as defined by the schema, are extracted from a document stored in a primary database. The document properties are then stored in a search database. The definition of the schema itself is stored in a flat file, an XML Schema file, a database, or another type of file that is separate from the search database. The schema definition is implemented by an indexing service. The schema is assigned a version number, which is incremented or otherwise changed when the properties defined by the schema change (for example, the schema version number is incremented when a new document property is added to an existing schema). The schema version number is stored with the document in the search database as a schema version number and also in a separate schema version lookup table as a target version number. In some cases, the target version number corresponds to the most recent version of the schema, while the schema version number corresponds to the version of the schema definition that was used to index the document in the search database. In some other cases, the target version number corresponds to the most recent version of the schema as it applies to certain users/clients. For example, if a property is added to the search index that is only relevant for certain users/clients, then the target version number in the schema version lookup table is changed only for those users/clients.

When a user submits a search query, the query is executed against the search database. If a document in the search database satisfies the search query, the schema version number associated with the document in the search database is compared to the target version number in the schema version lookup table. If the schema version number matches the target version number, then the document stored in the search database is up-to-date and can be presented to the user. If the schema version number does not match the target version number, or if no document in the search database satisfies the search query and the schema version lookup table includes a re-indexing marker for the user or client associated with the search query, then the search database is not synchronized with the primary database. In these cases, the process triggers the indexing service to selectively re-index the document. The re-indexing includes copying the document properties defined by the schema from the primary database to the search database. In this manner, the search database is only re-indexed if there is a mismatch between the target version number (stored in the schema version lookup table) and the schema version number (stored in the search database), or if no document in the search database satisfies the search query and the schema version lookup table includes a re-indexing marker for the user or client associated with the search query.

Any number of non-transitory machine-readable mediums (e.g., embedded memory, on-chip memory, read only memory, random access memory, solid state drives, and any other physical storage mediums) are used to encode instructions that, when executed by one or more processors, cause an embodiment of the techniques provided herein to be carried out, thereby allowing for selectively re-indexing a database. Likewise, the techniques can be implemented in hardware (e.g., logic circuits such as field programmable gate array, purpose-built semiconductor, microcontroller with a number of input/output ports and embedded routines). Numerous variations and embodiments of the disclosed techniques will be appreciated in light of this disclosure.

DETAILED DESCRIPTION

Figure 1:
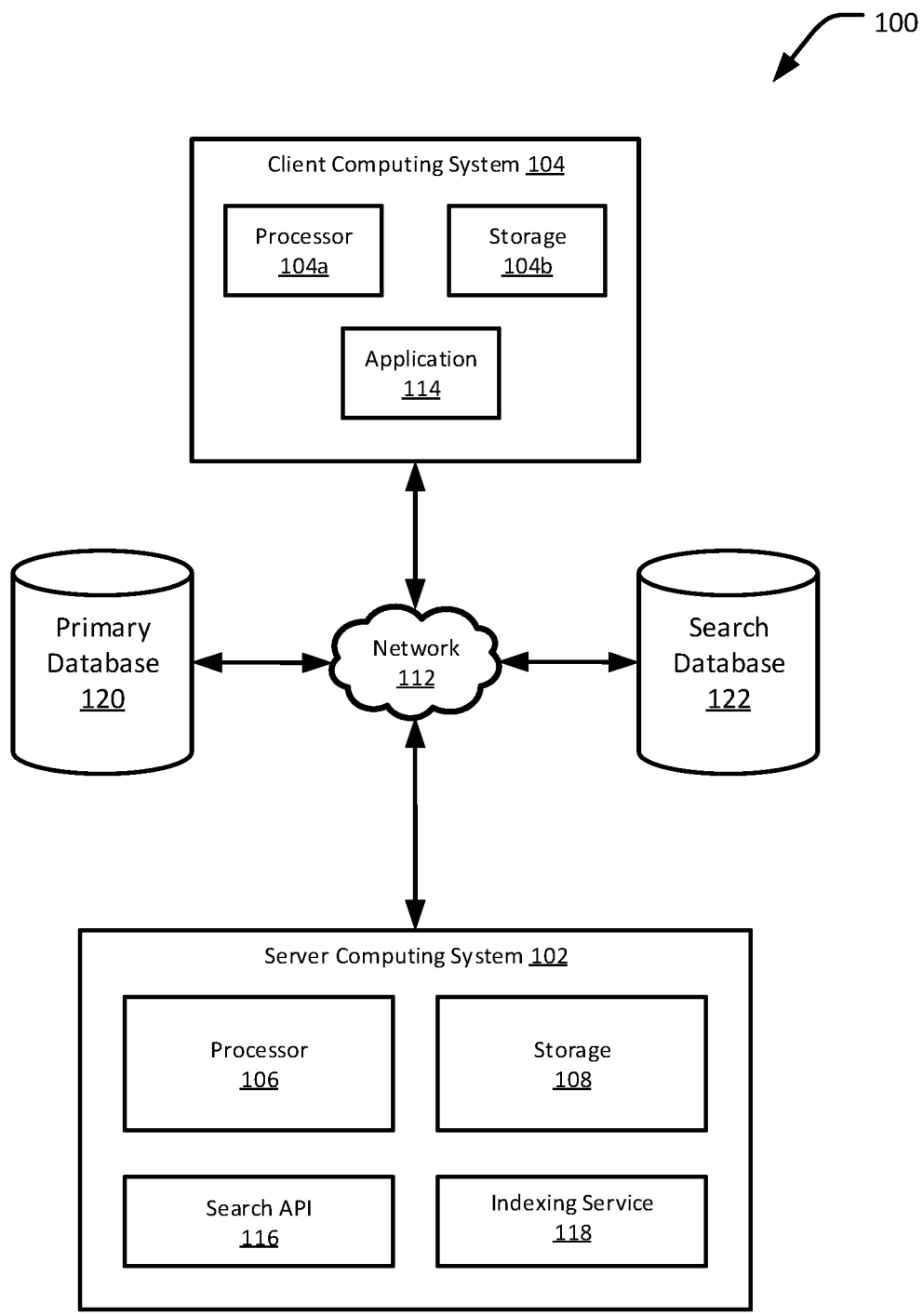
FIG. 1 illustrates an example system for selectively re-indexing a database, in accordance with an embodiment of the present disclosure.

This disclosure provides techniques for selective re-indexing of a database or other type of data store. In accordance with an embodiment of the present disclosure, a set of document properties or other metadata, pre-defined in a schema, are associated with one or more documents stored in a primary database or other data repository. A schema defines which of the document properties are stored in a search database, which is stored separately from the primary database. The schema can be, for example, a flat file containing the document properties. The schema can be associated with the properties of an individual document, a group or class of documents, or other criteria, such as a repository (database) or document owner (user). The schema is associated with a version number, and different versions of the schema are assigned different version numbers. When a document is indexed into the search database, the version number of the schema at the time of indexing, also referred to as the schema version number, is stored in the search database. In some examples, when the schema is changed or otherwise updated, the current version number of the schema, also referred to as a target version number, is stored in a schema version lookup table. In some other examples, when the schema is changed or otherwise updated for a particular user/client, the target version number is stored in the schema version lookup table only with respect to that user/client. For example, a property that is only used in one particular application is added to the schema definition, the target version number is increased only with respect to that particular application.

Each time a new document is ingested into the primary database, the properties defined by the current schema for that document are stored in the search database. Through a synchronization process, implemented by an indexing service, the documents, the document properties, and other data stored in the primary database are stored in the search database. The search database can handle search queries on the documents in an efficient and scalable manner, relieving the primary database from the load associated with the searches. A search query generated by an application is thus executed against the search database instead of against the primary database. So long as the document properties (defined by the schema) in the search database are synchronized with the primary database, the results of the search query will be current. However, a synchronization failure or latent synchronization delay can cause at least some of the data in the search database to become stale. In case of such a synchronization failure or delay, the search database should be re-indexed to restore synchronization.

To this end, in accordance with an embodiment of the present disclosure, when the search query is executed against the search database, a document satisfying the search query (if any) is returned from the search database along with the corresponding schema version number stored in the search database. The schema version number stored in the search database is compared against the target version number associated with the document in the schema version lookup table. If the schema version number is different from the target version number, then the data in the search database is presumed to be stale and a re-indexing of the search database is requested to bring the index current. The re-indexing can occur on a single document, multiple documents, or any other set of data. The re-indexing process is thus reactive (i.e., it is performed in response to a search query rather than proactively) and can be optimized based on a set of rules, for example, by requesting re-indexing of only the stale data discovered during execution of the search query, which reduces the load on the primary database. Numerous variations and embodiments of the disclosed techniques will be appreciated in light of this disclosure.

Overview

Cloud-based services provide the ability for users to search data included in a so-called primary database. However, searching processes can place a high load on the primary database when it is not scaled or otherwise designed to handle search queries efficiently. By instead searching a separate search database that is designed to handle such search queries, the load on the primary database is reduced. For accurate search results, the search database must be synchronized with the primary database to keep the data current. This synchronization process is also referred to as indexing, where data in the search database is updated to match data in the primary database. If there is a synchronization failure or a latent delay in synchronization, then data in the search database may not be current, which causes the search results to be invalid or incomplete (a stale data problem). Thus, the search database should be re-indexed from the primary database to bring the search database current again.

A non-trivial problem with re-indexing a database is that the process is time and resource intensive, particularly because it does not discriminate between users who actively search the database and those who do not. For instance, re-indexing data for users who rarely or never search the database may be wasteful since searches for the data are unlikely to be performed. For such users, stale data in the database is not a factor, and thus there is less value in keeping that data current. Even for users who actively search the database, it may not be necessary to re-index all of that user's data because only a portion of it may be stale and, in any event, the user is not likely to be actively searching all of his or her data. Therefore, a more selective re-indexing process can potentially reduce the time and resources needed to synchronize the search database with the primary database by focusing on data that is actively being searched.

To this end, the disclosed techniques include a process for selectively re-indexing the search database. A schema defines a set of properties of a document or a class of documents stored in the primary database. The schema can be any document, such as a wiki-type flat file document or another type of file that is stored separately from the primary database and search database. A version number is associated with the schema. The version number of the schema is updated whenever there is a change to the schema, such as when a searchable property of a document is added to the schema. When a user submits a search query, the query is executed against the search database. If a document in the search database satisfies the search query, the schema version number associated with the document is compared to a target version number, which is stored in a schema version lookup table. If the schema version number matches the target version number, then the search database is up-to-date, and the document can be presented to the user. If the schema version number does not match the target version number, or if no document in the search database satisfies the search query and the schema version lookup table includes a re-indexing marker for the user or client associated with the search query, then the search database is not synchronized with the primary database. In this case, the process triggers an indexing service to selectively re-index the search database. The re-indexing includes copying the properties of a document that satisfies the search query from the primary database to the search database.

In this manner, the search database is only re-indexed if, responsive to the results of a search query, there is a mismatch between the target version number (stored in the schema version lookup table) and the schema version number (stored in the search database), or if no document in the search database satisfies the search query and the schema version lookup table includes a re-indexing marker for the user or client associated with the search query. This process reduces the time and resources needed to maintain synchronization between the primary database and the search database because it only re-indexes documents that are actively being sought by the user and only if the document in the search database is discovered to be stale when the search query is executed, such as due to a prior synchronization failure or latent synchronization delay. Thus, when a search query is executed against the search database, the results can fall into one of three general cases: (1) where the schema version number in the search database is different from the target version number in the schema version lookup table (the search database has stale data); (2) where the schema version number is the same as the target version number (the search database has current data); and (3) where no document in the search database satisfies the search query and the schema version lookup table includes a re-indexing marker for the user or client associated with the search query (the search database is not synchronized with the primary database for the searched document or class of documents). In cases (1) and (3), re-indexing is triggered because the data in the search database is stale. In case (2), no re-indexing is needed because the data in the search database is current, and the document is retrieved using the search database.

Example Selective Database Re-Indexing System

FIG. 1 illustrates an example system 100 for selectively re-indexing a database, in accordance with an embodiment of the present disclosure. The system 100 includes a server computing system 102 having at least one processor 106, one or more storage devices 108, including at least one non-transitory storage medium, and an indexing service 118. The system 100 further includes one or more client computing devices 104 each configured to execute an application 114. The application 114 can be any program executable by one or more processors 104a of the client computing system 104 and stored in the storage 104b of the client computing system 104. The application 114 is configured to interact with a display or other user output device, a user input device, and/or, via the network 112, the server computing system 102 including a search application programming interface (API) 116 and the indexing service 118. The application 114 is further configured to interact, via the search API 116 and the network 112, with the indexing service 118, a primary database 120, and/or a search database 122.

The processor 106 of the server computing system 102 is configured to execute the indexing service 118 and to execute one or more search queries received from the one or more client computing devices 104 via the API 116. In some embodiments, the indexing service 118 is configured to receive or retrieve data that are stored in an external storage (e.g., the primary database 120 and/or the search database 122) and/or the storage device(s) 104b, 108 of the system 100. In some embodiments, the external storage is local to the server computing system 102 (such as an external hard drive accessible via a local data bus or communication port) or remote to the server computing system 102 (such as cloud- or network-based storage accessible via the network 112). The external storage includes, for example, a stand-alone external hard drive, an external FLASH drive or memory, a networked hard drive, a server, and/or networked attached storage (NAS).

The client computing system 104 can include a computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform at least some of the operations described in this disclosure. In some embodiments, a distributed computational system is provided including a plurality of server computing systems 102 and client computing systems 104. Further note that the client computing system 104 includes, for example, a client in a client-server environment, where at least a portion of the indexing service 118 on the server computing system 102 is served or otherwise made accessible to the client computing system 104 via the network 112 (e.g., the Internet and a local area network that is communicatively coupled to the client computing system 104).

The system 100 includes one or more storage devices or non-transitory computer program products including one or more non-transitory machine-readable mediums having computer-readable instructions or software encoded thereon for implementing techniques as variously described in this disclosure. The storage device(s) includes a computer system memory or random access memory, such as a durable disk storage (which includes any suitable optical or magnetic durable storage device, e.g., RAM, ROM, Flash, USB drive, or other semiconductor-based storage medium), a hard drive, CD-ROM, or other computer readable mediums, for storing data and computer-readable instructions or software that implement various embodiments as taught in this disclosure. In some embodiments, the storage device(s) includes other types of memory as well, or combinations thereof. The non-transitory computer-readable medium includes, but is not limited to, one or more types of hardware memory, non-transitory tangible media (for example, one or more magnetic storage disks, one or more optical disks, one or more USB flash drives), and the like. The non-transitory computer-readable medium stores computer-readable and computer-executable instructions or software for implementing various embodiments (such as instructions for an operating system as well as image processing software that includes the indexing service 118).

Example Use Cases

Figure 2A:
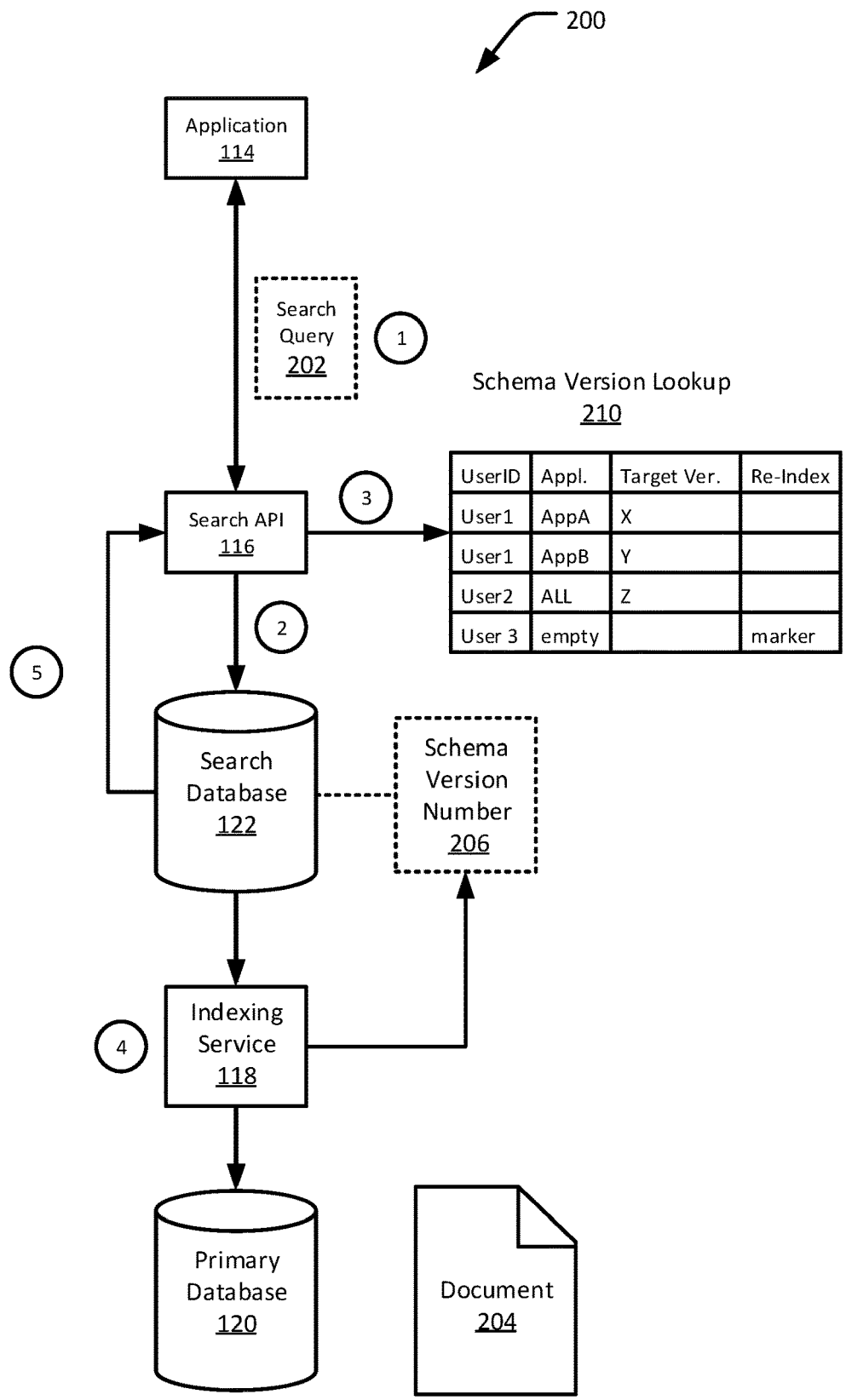
FIGS. 2A-B are flow diagrams representing example document retrieval and database re-indexing use case scenarios that can be implemented in the system of FIG. 1, in accordance with an embodiment of the present disclosure.
Figure 2B:
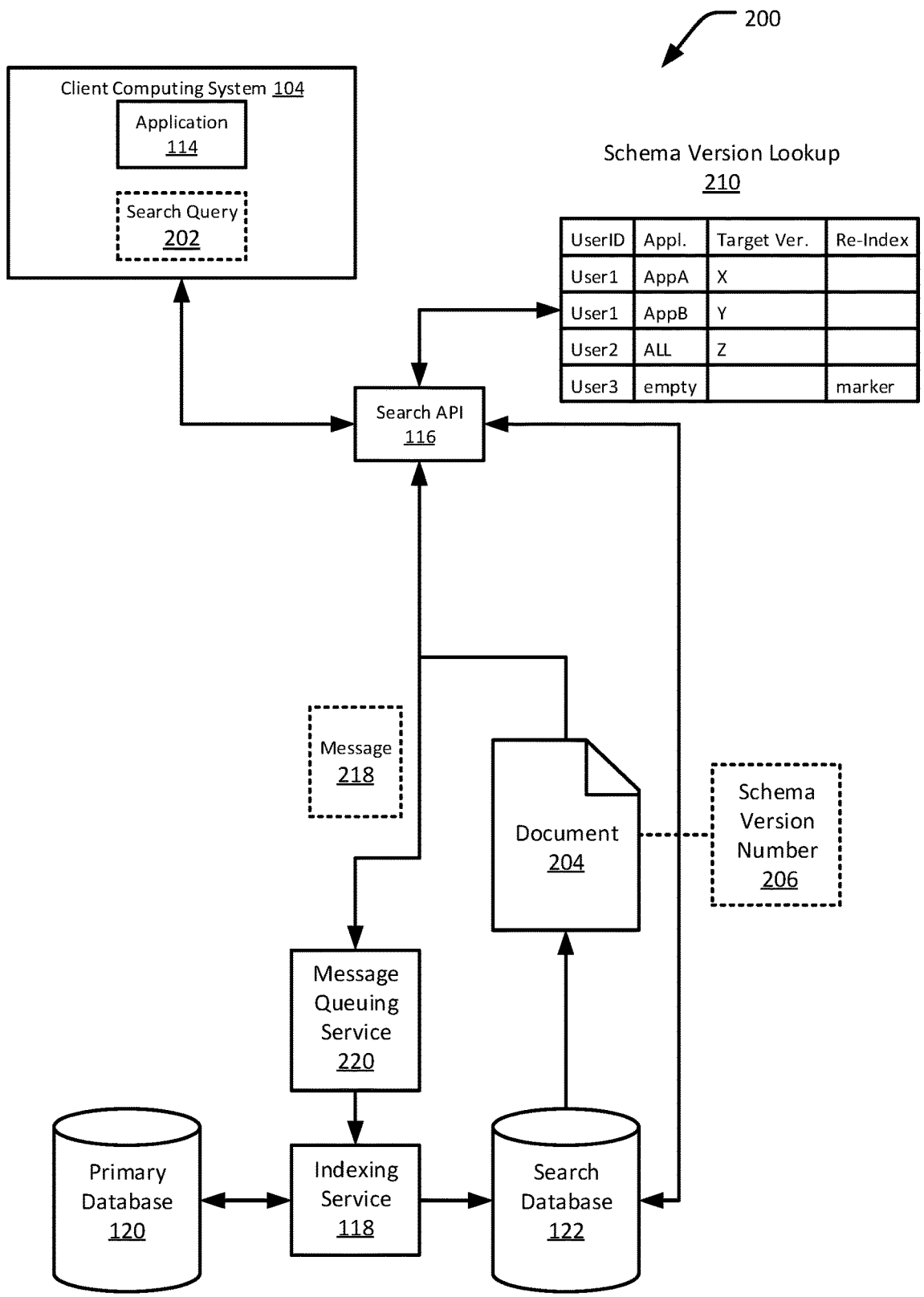

FIGS. 2A-B are flow diagrams representing example document retrieval and database re-indexing use case scenarios 200, in accordance with an embodiment of the present disclosure. As discussed above, when a search query 202 is executed against the search database 122, the results of the query can fall into one of three general use cases: (1) where the schema version number is different from the target version number (the search database has stale data); (2) where the schema version number is the same as the target version number (the search database has current data); and (3) where no document in the search database 122 satisfies the search query and the schema version lookup table includes a re-indexing marker for the user or client associated with the search query (the search database is not synchronized with the primary database for the searched document or class of documents).

As noted above, the schema version lookup table 210 includes a list of users and/or clients, a list of applications associated with each user/client, and a list of target version numbers associated with each user/client and application. The target version number represents the current schema version number for the respective user/client and application(s). When the schema is changed or otherwise updated (for example, when a new document property is added to the schema), then the target version number is updated to match the current schema version number. For example, consider the following scenario.

Assume a document with the following properties is stored in the primary database 120:
id: 1
name: John
location: New York
balance: 100
The following schema is defined for the document:
{name, location} schema_version=1
In this case, the indexing service 118 fetches the document and sends only the information {name=John, location=New York}, as specified by the schema (version=1) to the search database. However, if the "balance" property of the document is to be added to the search database, the schema is changed to:
{name, location, balance} schema_version=2
After this change to the schema, all documents added to the search database 122 will also contain the property "balance" with schema version=2 instead of 1. The schema can be stored, for example, in a flat file and describes the properties that are stored in the search database 122.

In another example, when the schema is changed or otherwise updated (for example, when a new document property is added to the schema) for a particular user/client or application, then the target version number is updated to match the current schema version number with respect to that particular user/client or application. For example, consider the following scenario. If a property "balance" is added to the schema for a "bank application," then the schema version number can be updated as follows:
userId=user1, app1="bank application", target version=2 (i.e., the new schema version)
userId=user1, app1="ALL", target version=1 (i.e., the old schema version)
This results in re-indexing only records of the user, if the user accesses the data via the "bank application," but not if the user accesses the data via any other application.

When a search query is executed against the search database 122, the schema version number associated with the document is retrieved from the search database and compared to the target version number stored in the schema version lookup table 210. For example, consider the following scenario:

If a search query is executed to find all names where "location=New York," the document with "id=1" from above is returned from the search database 122. If, as shown below, the returned document has "schema_version=1" and the target version number in the schema version lookup table 210 is "schema_version=2," then re-indexing is triggered.
Search Query: select*where location="New York"
Query result: {id:1, name: John, location: New York, schema_version: 1}
Lookup Table: {UserId: John; Target_Version: 2}

Referring first to FIG. 2A, for use case (1) above, where the schema version number is different from the target version number, the flow is as follows: 1-2-3-4. At step (1), the application 114 sends the search query 202 to the search API 116. The search query 202 includes one or more search terms or search parameters that specify one or more conditions that must be satisfied when conducting a search of data and documents via the search database 122. At step (2), the search API 116 causes the search query 202 to be executed against the search database 122. At step (3), the search API 116 compares the schema version number 206 of a document 204 satisfying the search query 202 to the target version number stored in a schema version lookup table 210. If, as in this case, the schema version number 206 is different from the target version number in the schema version lookup table 210, at step (4) the search API 116 causes the indexing service 118 to re-index the document 204 in the search database 122 with the current schema version number 206 of the document 204 from the primary database 120.

Continuing with FIG. 2A, for use case (2) above, where the schema version number is the same as the target version number, the flow is as follows: 1-2-3-5. At step (1), the application 114 sends the search query 202 to the search API 116. At step (2), the search API 116 causes the search query 202 to be executed against the search database 122. At step (3), the search API 116 compares the schema version number 206 of the document 204 satisfying the search query to the target version number stored in the schema version lookup table 210. If, as in this use case, the schema version number 206 is the same as the target version number in the schema version lookup table 210, at step (5), the document 204 is retrieved from the search database 122 and returned to the application 114 via the search API 116. In some cases, if the search database 122 only holds properties that are needed for executing the search query 202, but the application 114 requests all properties stored in the primary database 120, an additional call to the primary database 120 can be performed.

Continuing with FIG. 2A, for use case (3) above, where no document in the search database 122 satisfies the search query and the schema version lookup table 210 includes a re-indexing marker for the user or client associated with the search query (e.g., an "empty" marker shown in the schema version lookup table 210 of FIG. 2A), the flow is as follows: 1-2-3-4. At step (1), the application 114 sends the search query 202 to the search API 116. At step (2), the search API 116 causes the search query 202 to be executed against the search database 122. At step (3), the search API 116 determines that the re-indexing marker is in the schema version lookup table 210. If, as in this case, no document in the search database 122 satisfies the search query and (at step (3)) if there is a re-indexing marker in the schema version lookup table, at step (4) the search API 116 causes the indexing service 118 to re-index the document by adding the document properties (from the primary database 120), as defined by the current schema, and the corresponding schema version number to the search database 122.

FIG. 2B provides a different perspective of the use case scenarios 200 of FIG. 2A. In FIG. 2B, the application 114 executing on the client computing system 104 generates the search query 202 for searching the search database 122. As noted above, the search query 202 includes one or more search terms or search parameters that specify one or more conditions that must be satisfied when conducting a search of data and documents stored in the search database 122. Initially, the search API 116 causes the search query 202 to be executed against the search database 122. The search database 122 can potentially include at least one document 204 that satisfies the search query 202, although it will be understood that in some instances there may be no documents in the search database 122 that satisfy the search query 202.

If the document 204 is stored in the search database 122 and satisfies the search query 202, then a schema version number 206 associated with the document 204 is retrieved from the search database 122. The schema version number 206 is then compared to a target version number stored in the schema version lookup table 210. As discussed above, the target version number corresponds to the version number of the current schema that defines the document properties to be stored in the search database 122. The schema version lookup table 210 includes a list of users/clients, applications, and target version numbers associated with the users/clients and the applications. For example, in the schema version lookup table 210, a user User1 may be associated with an application AppA, or a class of applications (e.g., word processing documents, spreadsheet documents, image documents, etc.) for which the target version number is X. The user User1 may be further associated with another application or class of applications for which the target version number is Y, and so forth. Another user User2 may be associated with an application or a class of applications for which the target version number is Z. Other such examples will be apparent in light of this disclosure. If the schema version number 206 is the same as the target version number stored in the schema version lookup table 210, then the document 204 is returned to the application 114 via the search API 116, and the search query is complete. However, if the schema version number 206 is different from the target version number stored in the schema 210, then the search database 122 is considered stale. In this case, the search API 114 sends a re-indexing request message 218 to the indexing service 118 via a message queuing service 220. The message queuing service 220 can provide, for example, a request-reply pattern, where the search API 114 sends the message 218 to the indexing service 118 via a request queue of the message queuing service 220, and when re-indexing is complete the indexing service 118 sends a "done"-like message back to the search API 114 via the message queuing service 220. The message 218 includes a request for the indexing service 118 to re-index at least a portion of the search database 122 relating to the document 204. If, for example, the search database 122 is stale and a version of the document 204 is stored in the primary database 120, the re-indexing service 118 can copy the document properties defined by the schema from the primary database 120 to the search database 122. In some cases, the document 204 can be returned to the application 114 via the search API 116, and the search query is complete.

If, on the other hand, there are no documents or other data in the search database 122 that satisfy the search query 202 and the schema version lookup table 210 includes a re-indexing marker for the user or client associated with the search query, the search API 116 sends the re-indexing request message 218 to the indexing service 118 via a message queuing service 220. As discussed above, the message queuing service 220 can provide, for example, a request-reply pattern, where the search API 114 sends the message 218 to the indexing service 118 via a request queue of the message queuing service 220, and when re-indexing is complete the indexing service 118 sends a "done"-like message back to the search API 114 via the message queuing service 220. The message 218 includes a request for the indexing service 118 to being re-indexing at least a portion of the search database 122 relating to the document 204. If, for example, a version of the document 204 is stored in the primary database 120, the re-indexing service 118 can copy the document properties defined by the schema from the primary database 120 to the search database 122.

Example Methodologies for Selective Re-Indexing of a Database

Figure 3:
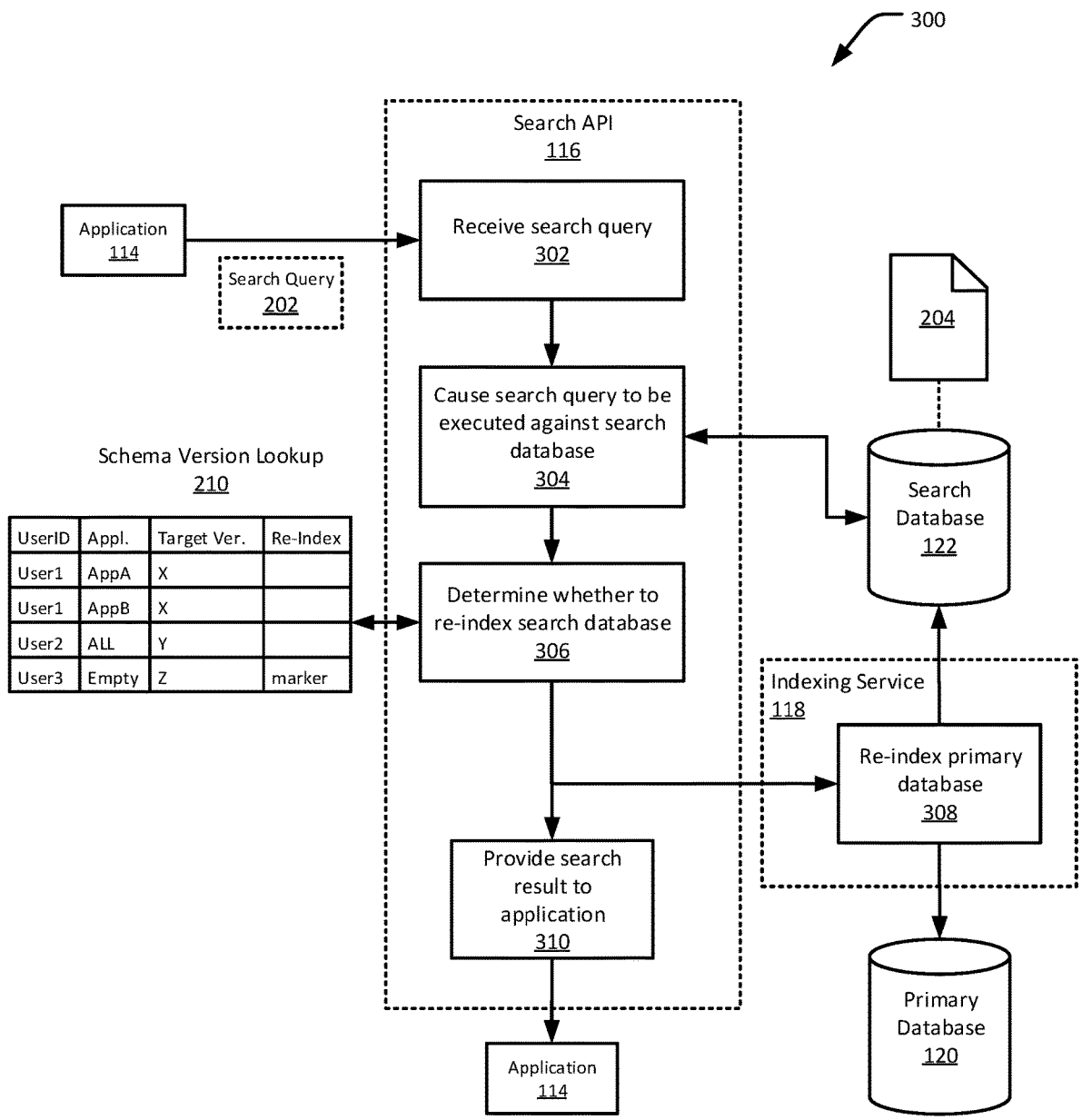
FIG. 3 is a block diagram representing a methodology for selective database re-indexing that can be implemented in the system of FIG. 1, in accordance with an embodiment of the present disclosure.

FIG. 3 is a block diagram representing a methodology 300 for selective database re-indexing, in accordance with an embodiment of the present disclosure. The methodology 300 can be implemented, for example, in the system 100 of FIG. 1. In the methodology 300, the search API 116 receives 302 a search query (e.g., the search query 202 of FIG. 2) from the application 114 and causes 304 the search query to be executed against the search database 122 by the server computing system. Based on the result of the search and the schema version lookup table 210, the search API determines 306 whether to re-index the search database 122. For example, if the schema version number of a document (e.g., document 204) in the search result, from the search database 122, does not match the target version number stored in the schema version lookup table 210, then the search API 116 causes the search database 122 to be re-indexed 308. In another example, if no document in the search database 122 satisfies the search query and the schema version lookup table includes a re-indexing marker for the user or client associated with the search query, then the search API 116 causes the search database 122 to be re-indexed 308. In either case, the indexing service 118 executes independently of the search API 116 to re-index (synchronize) the search database 122 with the primary database 120.

In some cases, the search API 116 provides 310 the search result (e.g., document 204), from the search database 122, to the application 114. For example, if the schema version number of the document (e.g., document 204) in the search results matches the target version number stored in the schema 210, then the search API 116 provides 310 the search result (e.g., document 204) to the application 114.

Figure 4:
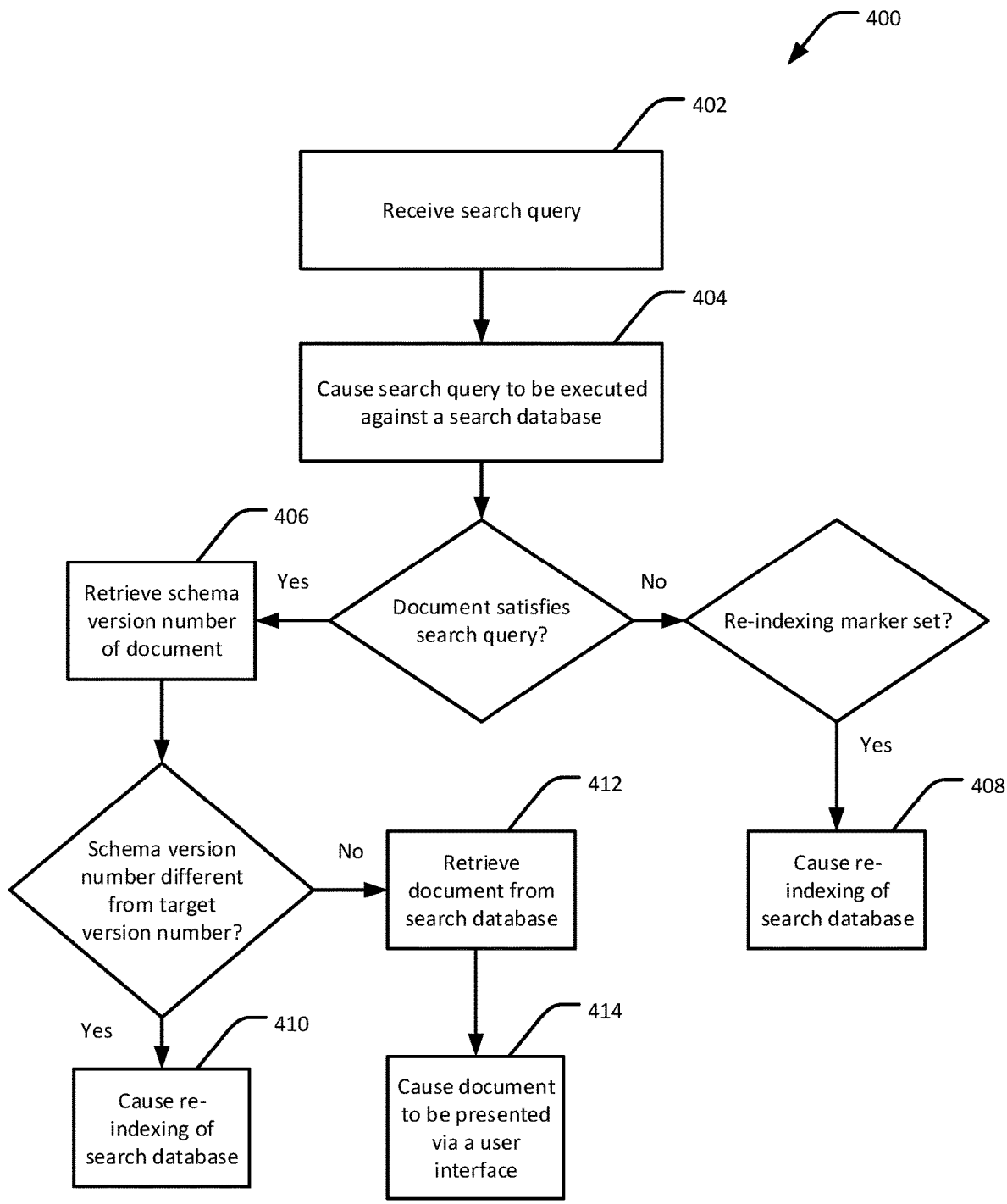
FIG. 4 is a block diagram representing another methodology for selective database re-indexing that can be implemented in the system of FIG. 1, in accordance with an embodiment of the present disclosure.

FIG. 4 is a block diagram representing another methodology 400 for selective database re-indexing, in accordance with an embodiment of the present disclosure. The methodology 400 can be implemented, for example, in the system 100 of FIG. 1. The methodology 400 begins by receiving 402 a search query and causing 404 the search query to be executed against a search database. If the search query returns a document satisfying the search query, a schema version number of the document is retrieved 406 from the search database. The document (if any) is associated with a unique identifier, which can, for example, represent a single document using a unique ID, and/or a hierarchy of documents using a user ID and/or a client ID. Otherwise, in some embodiments, the methodology 400 causes 408 re-indexing of the search database if a re-indexing marker is set in the schema version lookup table 210. For example, if the search query does not return any documents, and if a re-indexing marker is set for the user/client associated with the search query, then re-indexing of the search database is triggered.

If the index number of the document from the search database is different from a target version number stored a schema version lookup table, then the methodology 400 causes 410 re-indexing of the document in the search database by sending a message (e.g., the message 218 of FIG. 2B) including the unique identifier to the indexing service via a message queuing service (e.g., the message queuing service 220 of FIG. 2B). Otherwise, the document is retrieved 412 from the search database. In some embodiments, the methodology 400 further includes causing 414 the document to be presented via a user interface. In some examples, a schema is associated with a user and/or a client that submitted the search query, such that different schemas can be associated with different users/clients or groups of users/clients. In some other examples, the schema can be associated with any number of users/clients. As noted above, the schema defines a set of properties associated with one or more documents that are stored, or are to be stored, in the search database. Each schema is associated with a version number, which is incremented or otherwise changed when the schema is changed (for example, when a new document property is added to the schema). The version number of the current schema is stored in the schema version lookup table as the target version number.

Figure 5:
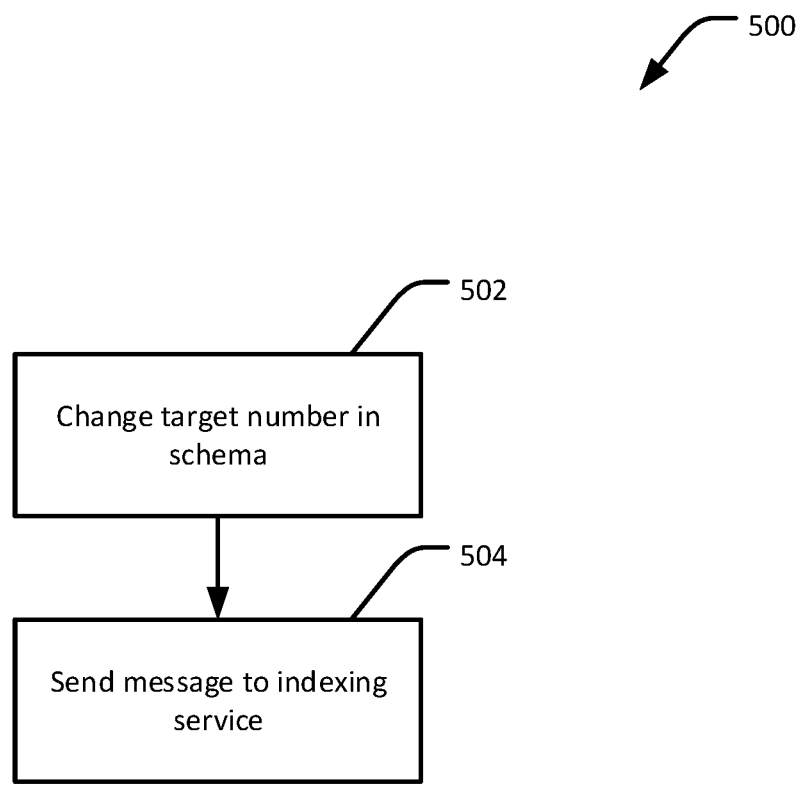
FIG. 5 is a block diagram representing another methodology for selective database re-indexing that can be implemented in conjunction with the methodology of FIG. 4, in accordance with an embodiment of the present disclosure.

FIG. 5 is a block diagram representing another methodology 500 for selective database re-indexing, in accordance with an embodiment of the present disclosure. In some examples, the methodology 500 includes changing 502, in the schema version lookup table, the target version number in response to a change in at least one property associated with the document as defined in the schema, such that the target version number is different from the schema version number of a corresponding document property stored in the search database. For example, the document can have one or more properties, such as "id," "name," "location," and "balance." Adding any of these properties to the schema, or otherwise changing the properties, can thus cause a change in the target version number (e.g., from version 1 to version 2). In response to changing the target version number in the schema version lookup table, the methodology 500 includes causing the indexing service to re-index the document in the search database by sending 510 a message including the unique identifier to the indexing service via the message queuing service, which causes the indexing service to re-index the primary database for at least the document associated with the unique identifier.

FURTHER EXAMPLES

Example 1 provides a method for re-indexing a search database, the method comprising: receiving a search query; causing the search query to be executed against the search database to determine whether a document stored in the search database satisfies the search query, the document being associated with a unique identifier; and in response to determining that the document stored in the search database satisfies the search query, retrieving, from the search database, a schema version number of the document, comparing the schema version number to a target version number associated with the document, the target version number being stored in a schema version lookup table, and in response to the schema version number being different from the target version number, causing an indexing service to re-index the document by sending a message including the unique identifier to the indexing service via a message queuing service.

Example 2 includes the subject matter of Example 1, further comprising, in response to the schema version number being the same as the target version number: retrieving the document from the search database; and causing presentation of the document via a user interface.

Example 3 includes the subject matter of any of Examples 1-2, wherein the method further comprises: causing the indexing service to retrieve, from a primary database, at least one property associated with the document satisfying the search query; and causing the indexing service to store, in the search database, i) the at least one property associated with the document, and ii) a schema version number of the document.

Example 4 includes the subject matter of any of Examples 1-3, further comprising causing presentation of the document via a user interface.

Example 5 includes the subject matter of any of Examples 1-4, wherein the storing of the target version number of the second document in the schema is performed in response to storing the copy of the second document in the search database.

Example 6 includes the subject matter of any of Examples 1-5, wherein the method further comprises changing, in the schema version lookup able, the target version number in response to a change in at least one property associated with a schema.

Example 7 includes the subject matter of Example 6, further comprising, in response to changing the target version number in the schema version lookup table, causing the indexing service to re-index the document by sending the message including the unique identifier to the indexing service via the message queuing service.

Example 8 includes the subject matter of any of Examples 1-7, wherein the target version number is associated with a user and/or a client that submitted the search query.

Example 9 provides a search database re-indexing system comprising: a storage including a search database; and at least one processor operatively coupled to the storage, the at least one processor configured to execute an application programming interface (API) to receive a search query from a client computing device; cause the search query to be executed against the search database by a server computing system to determine whether a document stored in the search database satisfies the search query, the document being associated with a unique identifier; in response to determining that the document stored in the search database satisfies the search query, retrieve, from the search database via a network, a schema version number of the document, and compare the schema version number to a target version number associated with the document, the target version number being stored in a schema version lookup table; and in response to the schema version number being different from the target version number, cause an indexing service executable by the server computing system to re-index the document in the search database by sending a message including the unique identifier to the indexing service via a message queuing service; and in response to the schema version number being the same as the target version number, and retrieve the document from the search database via the network.

Example 10 includes the subject matter of Example 9, wherein the at least one processor is further configured to: cause the indexing service to retrieve, from a primary database, at least one property associated with the document satisfying the search query; and cause the indexing service to store, in the search database, i) the at least one property associated with the document, and ii) a schema version number of the document.

Example 11 includes the subject matter of Example 10, wherein the storing of the at least one property associated with the document in the search database is in response to the schema version number being different from the target version number.

Example 12 includes the subject matter of any of Examples 9-11, wherein the at least one processor is further configured to cause presentation of the document via a user interface of the client computing device.

Example 13 includes the subject matter of any of Examples 9-12, wherein the at least one processor is further configured to change, in the schema version lookup table, the target version number in response to a change in at least one property associated with a schema.

Example 14 includes the subject matter of Example 13, wherein the at least one processor is further configured to, in response to changing the target version number in the schema version lookup table, cause the indexing service to re-index the document by sending the message including the unique identifier to the indexing service via the message queuing service.

Example 15 includes the subject matter of any of Examples 9-14, wherein the target version number is associated with a user and/or a client that submitted the search query.

Example 16 provides a computer program product including one or more non-transitory machine-readable mediums having instructions encoded thereon that when executed by at least one processor cause a process to be carried out for re-indexing a search database, the process comprising: receiving a search query from a user; causing the search query to be executed against the search database to determine whether a document stored in the search database satisfies the search query, the document being associated with a unique identifier; in response to determining that the document stored in the search database satisfies the search query, retrieving, from the search database, a schema version number of the document, comparing the schema version number to a target version number associated with the document, the target version number being stored in a schema version lookup table, and in response to the schema version number being different from the target version number, causing an indexing service to re-index the document in the search database by sending a message including the unique identifier to the indexing service via a message queuing service; and in response to determining that no document stored in the search database satisfies the search query, causing the indexing service to retrieve, from a primary database, at least one property associated with the document satisfying the search query, and causing the indexing service to store, in the search database, i) the at least one property associated with the document, and ii) a schema version number of the document.

Example 17 includes the subject matter of Example 16, wherein the process further comprises, in response to the schema version number being the same as the target version number: retrieving the document from the search database; and causing presentation of the document via a user interface.

Example 18 includes the subject matter of any of Examples 16-17, wherein the document is a first document, and wherein the process further comprises: causing the indexing service to retrieve, from a primary database, a least one property associated with the document satisfying the search query; and causing the indexing service to store, in the search database, i) the at least one property associated with the document, and ii) a schema version number of the document.

Example 19 includes the subject matter of any of Examples 16-18, wherein the process further comprises changing, in the schema version lookup table, the target version number in response to a change in at least one property associated with a schema.

Example 20 includes the subject matter of Example 19, wherein the process further comprises, in response to changing the target version number in the schema version lookup table, causing the indexing service to re-index the document by sending the message including the unique identifier to the indexing service via the message queuing service.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It will be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for re-indexing a search database, the method comprising:
   receiving a search query;
   causing the search query to be executed against the search database to determine whether a document stored in the search database satisfies the search query, the document stored in the search database being associated with a unique identifier; and
   in response to determining that no document stored in the search database satisfies the search query or that a schema version number of the document stored in the search database is different from a target version number associated with the document stored in the search database,
       causing the indexing service to retrieve, from a primary database, at least one property associated with a document satisfying the search query in the primary database, and
       causing the indexing service to store, in the search database, i) the at least one property associated with the document satisfying the search query in the primary database, and ii) the schema version number of the document satisfying the search query in the primary database.

2. The method of claim 1, further comprising, in response to the schema version number being the same as the target version number:
   retrieving the document from the search database; and
   causing presentation of the document via a user interface.

3. The method of claim 1, further comprising causing presentation of the document via a user interface.

4. The method of claim 1, wherein the storing of the at least one property associated with the document in the search database is in response to the schema version number being different from the target version number.

5. The method of claim 1, wherein the method further comprises changing, in the schema version lookup table, the target version number in response to a change in at least one property associated with a schema.

6. The method of claim 5, further comprising, in response to changing the target version number in the schema version lookup table, causing the indexing service to re-index the document by sending the message including the unique identifier to the indexing service via the message queuing service.

7. The method of claim 1, wherein the target version number is associated with a user and/or a client that submitted the search query.

8. The method of claim 1, further comprising:
in response to determining that the document stored in the search database satisfies the search query,
retrieving, from the search database, the schema version number of the document,
comparing the schema version number to the target version number associated with the document, the target version number being stored in a schema version lookup table, and
in response to the schema version number being different from the target version number, causing an indexing service to re-index the document in the search database by sending a message including the unique identifier to the indexing service via a message queuing service.

9. A search database re-indexing system comprising:
a storage including a search database; and
at least one processor operatively coupled to the storage, the at least one processor configured to execute an application programming interface (API) to
receive a search query from a client computing device;
cause the search query to be executed against the search database by a server computing system to determine whether a document stored in the search database satisfies the search query, the document being associated with a unique identifier;
in response to determining that no document stored in the search database satisfies the search query or that a schema version number of the document is different from a target version number associated with the document,
causing the indexing service to retrieve, from a primary database, at least one property associated with the document satisfying the search query, and
causing the indexing service to store, in the search database, i) the at least one property associated with the document, and ii) the schema version number of the document.

10. The system of claim 9, wherein the storing of the at least one property associated with the document in the search database is in response to the schema version number being different from the target version number.

11. The system of claim 9, wherein the at least one processor is further configured to cause presentation of the document via a user interface of the client computing device.

12. The system of claim 9, wherein the at least one processor is further configured to change, in the schema version lookup table, the target version number in response to a change in at least one property associated with a schema.

13. The system of claim 12, wherein the at least one processor is further configured to, in response to changing the target version number in the schema version lookup table, cause the indexing service to re-index the document by sending the message including the unique identifier to the indexing service via the message queuing service.

14. The system of claim 9, wherein the target version number is associated with a user and/or a client that submitted the search query.

15. The system of claim 9, wherein the process further comprises:
in response to determining that the document stored in the search database satisfies the search query,
retrieve, from the search database via a network, the schema version number of the document, and
compare the schema version number to a target version number associated with the document, the target version number being stored in a schema version lookup table;
in response to the schema version number being different from the target version number, cause an indexing service executable by the server computing system to re-index the document in the search database by sending a message including the unique identifier to the indexing service via a message queuing service; and
in response to the schema version number being the same as the target version number, retrieve the document from the search database via the network.

16. A computer program product including one or more non-transitory machine-readable mediums having instructions encoded thereon that when executed by at least one processor cause a process to be carried out for re-indexing a search database, the process comprising:
receiving a search query from a user;
causing the search query to be executed against the search database to determine whether a document stored in the search database satisfies the search query, the document being associated with a unique identifier;
in response to determining that the document stored in the search database satisfies the search query,
retrieving, from the search database, a schema version number of the document,
comparing the schema version number to a target version number associated with the document, the target version number being stored in a schema version lookup table, and
in response to the schema version number being different from the target version number, causing an indexing service to re-index the document in the search database by sending a message including the unique identifier to the indexing service via a message queuing service; and
in response to determining that no document stored in the search database satisfies the search query,
causing the indexing service to retrieve, from a primary database, at least one property associated with the document satisfying the search query, and
causing the indexing service to store, in the search database, i) the at least one property associated with the document, and ii) a schema version number of the document.

17. The computer program product of claim 16, wherein the process further comprises, in response to the schema version number being the same as the target version number:
retrieving the document from the search database; and
causing presentation of the document via a user interface.

18. The computer program product of claim 16, wherein the document is a first document, and wherein the process further comprises:

causing the indexing service to retrieve, from a primary database, a least one property associated with the document satisfying the search query; and causing the indexing service to store, in the search database, i) the at least one property associated with the document, and ii) a schema version number of the document.

19. The computer program product of claim 16, wherein the process further comprises changing, in the schema version lookup table, the target version number in response to a change in at least one property associated with a schema.

20. The computer program product of claim 19, wherein the process further comprises, in response to changing the target version number in the schema version lookup table, causing the indexing service to re-index the document by sending the message including the unique identifier to the indexing service via the message queuing service.

* * * * *